United States Patent
Frenkel

[11] Patent Number: 5,868,894
[45] Date of Patent: Feb. 9, 1999

[54] METHOD FOR PRODUCING CAST-IN-PLACE FLEXIBLE JOINED-TOGETHER CONSTRUCTIONAL STRUCTURES AND BUILDINGS

[76] Inventor: David Yakovlevich Frenkel, ul. Mogilevskaya, d. 32, kv. 155, Minsk, Belarus

[21] Appl. No.: 870,702

[22] Filed: Jun. 6, 1997

Related U.S. Application Data

[63] Continuation of Ser. No. 355,329, Dec. 12, 1994, abandoned.

[51] Int. Cl.$^6$ .................................................... B32B 31/00
[52] U.S. Cl. ......................... 156/281; 52/167; 52/730.2; 52/742.4; 156/304.1; 156/305; 156/319; 428/369; 524/66
[58] Field of Search ............................ 156/281, 305, 156/304.1, 319; 524/66; 52/742.14, 167.7, 730.2; 428/369

[56] References Cited

U.S. PATENT DOCUMENTS

| | | | |
|---|---|---|---|
| 2,466,963 | 4/1949 | Patrick et al. | 156/327 |
| 3,409,198 | 11/1968 | Peterman | 156/281 |
| 3,536,562 | 10/1970 | Shipp et al. | 524/66 |
| 3,931,078 | 1/1976 | Marrs et al. | 524/66 |

FOREIGN PATENT DOCUMENTS

| | | | |
|---|---|---|---|
| 1921169 | 6/1971 | Germany | 428/369 |
| 1765434 | 2/1993 | U.S.S.R. | |

*Primary Examiner*—John J. Gallagher
*Attorney, Agent, or Firm*—Pennie & Edmonds LLP

[57] ABSTRACT

A method for producing cast-in-place flexible joined-together constructional structures and buildings comprises applying to precleaned mating surfaces of the constructional structures and buildings involved a thiokol-containing compound incorporating the following components, wt %.

| | |
|---|---|
| liquid thiokol | 80–120 |
| inorganic pigment | 20–45 |
| vulcanizer of aerobic rubber hardening | 6.5–10.0 |
| adhesive additive | 5.5–7.5 |
| rubber hardener | 0.05–0.15 |
| cross-linking agent | 2.6–4.1 |
| modifier | 0.3–0.4 |
| coal tar | 14.5–31.2, | followed by filling a space confined between the mating surfaces with a mortar based on a cement having a maximum expansion ratio of 0.3%. Then the joined-together constructional structures or buildings are held for a period of time long enough for vulcanization of the thiokol-containing compound and cement hardening so as to impart elastomonolithic properties to the joined-together constructional structures or buildings involved.

18 Claims, 1 Drawing Sheet

METHOD FOR PRODUCING CAST-IN-PLACE FLEXIBLE JOINED-TOGETHER CONSTRUCTIONAL STRUCTURES AND BUILDINGS

This is a continuation, of application Ser. No. 08/355,329, filed Dec. 12, 1994, now abandoned.

FIELD OF THE INVENTION

The present invention relates in general to industrial construction engineering, and more specifically to a method for producing cast-in-place, flexible, joined together constructional structures and buildings.

The present invention can find widespread application in industrial, civil and hydraulic construction engineering, and in road building activities carried out in areas with increasing seismic activities. The present invention is most useful for repairing roadway pavements and pavements of airfield runways aimed at patching cracks and fractures resulting from, e.g., seismic impacts.

BACKGROUND OF THE INVENTION

More attention is drawn nowadays in worldwide practice to various techniques for reliably joining a diversity of structural elements made of concrete, reinforced concrete, metal, or glass.

Currently, there are quite a number of methods and techniques for joining together a variety of constructions in industrial, civil, and hydraulic construction engineering, as well as in road building.

A particular concern in these methods is the joint between the surfaces being joined together for which strict requirements are imposed for adhesive bond and water-tightness. Such joints may behave differently during operation and, are therefore, classified as flexible and rigid joints. Rigid joints are usually made by welding, e.g., steel inserts, or connecting reinforcement bars, or some other joinable elements of parts to be joined together, followed by tightening the joints are usually made by welding, concrete, or by bonding together the concrete surfaces being joined using polymer solutions. Flexible joints are usually made with the use of a metal or rubber stress compensator with its ends embedded into the construction members to be joined together and by a variety of polymer and bituminous sealing compounds.

However, joints made in such a way are too complicated in construction, hard-to-make, and may be water-permeable and liable to fail when exposed to impact loads.

Joined construction structures for use in underground transport construction engineering for water- and corrosion-proofing of industrial wastewater treatment facilities and in hydraulic construction engineering should possess, apart from mechanical strength, reliable water-tightness.

Constructional structures that leak water at their joints are liable to rapidly destruct, which involves enormous expenditures afterwards for repair-and-restoration work. When corrosive fluids are involved, which is the case for treatment facilities, environmental pollution is liable to occur as a result of failure of such facilities.

Known in current practice is the use of solutions for water-tighting of reinforced concrete structures. Such solutions incorporate standard portland cement, a self-stressing or self-expanding cement, an aggregate, and water. However, use of cements featuring high expansion- and self-stressing ratio has demonstrated that a considerable amount of stresses are liable to arise in the joint during the curing process, resulting in spalling and splitting of the material of the construction structures being joined together.

A similar joining practice is performed by a known quick-to-set sealing mixture, consisting of gypsum-aluminous expanding cement, aluminous cement, portland cement, chrysotile asbestos, and water. However, the fact that chrysotile asbestos, which is known to be a carcinogen, is used as a reinforcing material renders such mixture instable and impracticable.

Use of diverse superplasticiers is known to improve the features of diverse concrete mixes.

As it has previously been stated, flexibility of joints between constructions and structures is attained due to the use of a variety of sealing compounds applied to the joining surfaces of the structural elements. In particular, such sealing compounds are based on various rubbers, such as polyisobutylene rubber, butyl- and thickol rubbers.

For a combination of the features, a special concern in sealing compounds is whether compositions is based on liquid thiokols or liquid polysulfide rubbers. These are essentially oligomers which, after having been exposed to vulcanization, turn out to be cross-linked polymers, thus forming elastic products featuring good physico-mechanical, adhesive, and dielectric characteristics as well as high elasticity in a temperature range minus 60 to plus 90°–110° C.

Known in the art is a method for producing cast-in-place flexible joined-together constructional structures comprising a 0.5–2.0 mm thick layer of a mixture applied to the surfaces of the elements of the constructional structures to be joined together. Such mixture incorporates liquid thiokol (in combination with epoxy resin and pigments) (54–65.2 wt. %), a curing agent taken in an amount of 0.12–7.90 wt. % and appearing as a mixture of sodium bichromate, kaolin, diphenylquanidine, and water, coal tar (0.2–43.3 wt. %), and solvents. A space between the joining surfaces is immediately filled with a cement mortar having the following components (wt. %):

| | |
|---|---|
| cement based on aluminous slags and having a maximum expansion ration of 0.3% | 29.9–30.7 |
| mortar sand | 59.80-60-03 |
| water | 7.7–9.6 |
| plasticizer (optional) | 0.1–0.2 |
| hardener (SU A, 1,765,434, optional) | 0.75 |

After having been cured for a seven-day period sufficient for concrete hardening, the joined-together constructional structures acquire monolithic-and-elastic properties, and their joints retain strength and water-tightness after repeated exposure to transverse tensile and compression loads (5000 cycles on the average) as well as heating and cooling procedures.

However, such a method for producing cast-in-place flexible joints of constructional structures is too complicated for practical applications. This is because even an insignificant deviation from the formulation of the compound based on liquid thiokol and failure to observe the strict requirement as to the immediate and thorough homogenization of all components of the compound can result in disturbing the vulcanization process. The result of such a disturbance of the thiokol vulcanization process makes it impossible for a reliable adhesion of the surfaces being joined together under conditions of variable loads acting upon the joint material, more specifically, the cement stone. The resultant joint possesses neither strength nor flexibility. Apart from what has been discussed above, the known method under discussion involves an immediate application of the thiokol-based composition just after its preparation and thorough agitation. Thus, the fact that the vulcanization process occurs immediately after intermixing of the components prevents preliminary preparation of the composition.

The present invention has as its primary and essential object to provide a method for producing cast-in-place flexible joined-together constructional structures and buildings suitable for successful use in industrial construction engineering and reconditioning of constructions and buildings by providing a stable and reliable adhesion of the material of the structures being joined together to the joining material under conditions of variable loads and corrosive media.

SUMMARY OF THE INVENTION

The object of the present invention is accomplished by applying a thiokol-containing compound to the preliminarily cleaned joining surfaces of constructional structures and buildings, filling the space confined between said joining surfaces with a mortar based on a cement having a maximum expansion ratio of 0.3%, and holding the resultant joined-together constructional structure and building for a lapse of time long enough for vulcanization of the thiokol-containing compound and hardening of cement mortar so as to impart elastomonolithic properties to the constructional structures and buildings. According to the present invention, the following components are used for the thiokol-containing compound (wt. %):

| | |
|---|---|
| liquid thiokol | 80–120 |
| inorganic pigment | 20–45 |
| vulcanizer of aerobic rubber hardening | 6.5–10.0 |
| adhesive additive | 5.5–7.5 |
| rubber hardener | 0.05–0.15 |
| cross-linking agent | 2.6–4.1 |
| modifier | 0.3–0.4 |
| coal tar | 14.5–31.2 |

This compound is applied to the surfaces being joined together as a layer 0.1 to 2.0 mm thick.

According to the present invention, the resultant constructional structures and buildings are capable of withstanding, without failure, repeated cyclic effects of compression - tension (over 5000 cycles), and heating cooling (ageing coefficient after 100 cycles being 0.99–1.00). The combination of elastic and rigid materials that behave as a homogeneous material in joined-together structures and buildings ensures their reliable operation under most diverse loads, including seismic impacts.

According to the present invention, it is expedient that the mortar based on the cement has the following compound, the components being in wt. %:

| | |
|---|---|
| sulfoferritic cement | 42–44 |
| mortar sand | 42–44 |
| cement setting promoter | 1–2 |
| water | 15–17, | wherein the water/solid phase ratio is from 0.7 to 0.19.

Furthermore, it is expedient, according to the present invention, that the cement-based mortar also comprise a plasticizer in a maximum amount of 0.3% in terms of dry matter of the weight of the cement used.

It is also expedient, according to the present invention, that said cement-based mortar comprise a cement setting promoter selected from the group consisting of sodium aluminate, sodium fluoride, and liquid soda-ash glass.

To compensate for temperature strain arising in constructional structures and buildings as a result of surrounding temperature variations and maintain a preset strength of the structures and buildings, it is expedient, according to the present invention, that at least one rubber rod be placed in the space between the surfaces being joined together prior to the application of a layer of the thiokol-containing compound and that the latter be applied to both the surfaces being joined together and the rubber rod, whereupon said space accommodating the rubber rod will be filled with the cement-based mortar.

To increase the adhesive properties of the rubber rod surface with respect to cement, it is expedient, according to the present invention, that the cement-based mortar also contain aqueous thiokol dispersion, incorporating dry matter in an amount of 40–60 wt. %.

In order that the joined-together structures and buildings be capable of reliably compensating for dynamic and vibratory loads encountered in increasing seismic activity areas, it is expedient, according to the present invention, to use a rubber rod reinforced longitudinally with a metal wire rope.

It is expedient, according to the present invention, that when constructing antiseismic structures, the rubber rod be arranged in the space between the surfaces being joined together in a direction square with the surfaces.

In a preferred embodiment of the present invention, the rubber rod is arranged in the space in a direction parallel to the surfaces confining the space. As a result, it is due to the latter embodiment of the present invention that wear resistance of constructional structures, such as airfield runways and airdromes, can be increased under conditions of dynamic loads.

It is expedient, according to the present invention, that in order to increase the bearing capacity of the structures and buildings and to take up seismic vibrations and dynamic loads that are liable to occur, the joined together constructional structures and buildings have a reinforcing cage or framework made of rubber rods reinforced with a metal wire rope.

According to the present invention, it is expedient to use a thiokol-containing compound, incorporating the following components (wt. %):

| | |
|---|---|
| liquid thiokol | 100 |
| carbon black | 40 |
| cobaltosic oxide | 6.5 |
| aminopropyltriethoxysilene | 6.5 |
| $(HN_2(CH_3)_3Si(OC_2H_5)_3$ | |
| diphenylguanidine | 0.15 |
| ethylsilicate | 4.0 |
| oligoesteracrylate | 0.4 |
| coal tar | 17.1 |

Further objects and advantages of the present invention will become manifest from the following detailed description of a method for producing cast-in-place flexible joined-together constructional structures and buildings including specific embodiments of the method, appended claims, and accompanying drawings.

DETAILED DESCRIPTION OF THE INVENTION

Figure 1:
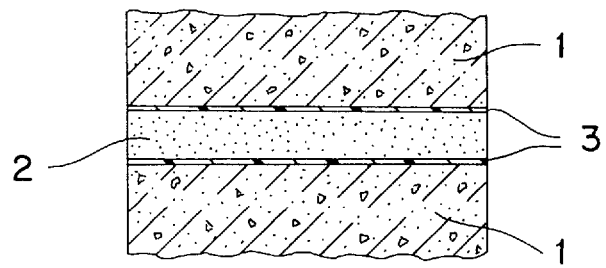
FIG. 1 is a cross section of a portion of the joint of prefabricated reinforced concrete structures according to the present invention.

According to the present invention, the surfaces to be joined together and the space confined therebetween in the constructional structures to be joined together to make up a single monolithic structure possessing a required stable degree of deformability or flexibility are, first and foremost, subjected to cleaning from dirt, corrosion, and fragments of the material of the constructional structure with a disturbed texture.

Next, the joining surfaces are treated with a thiokol-containing containing compound to obtain a layer of 0.1 to 2.0 mm thick. According to the present invention, the treating compound is essentially a mixture of the following components: liquid thiokol (liquid polysulfide rubber) of the following general formula:

taken in an amount of 80–120 wt. %; an inorganic pigment, preferably carbon black, taken in an amount of 20–45 wt. %; vulcanizer of aerobic rubber hardening, preferably cobaltosic oxide taken in an amount of 6.5–10.0 wt. %; adhesive additive, preferably alpha- and beta-isomers of aminopropyltrieth-oxysilene $(HN_2(CH_3)_3Si(OC_2H_5)_3$ taken in an amount of 5.5–7.5 wt. %; rubber hardener, preferably diphenylguanidine taken in an amount of 0.05–0.15 wt. %; cross-linking agent, preferably ethylsilicate, butylsilicate, or 2-methoxyethylsilicate taken in an amount of 2.6–4.1 wt. %; modifier, preferably oligoesteracrylate taken in an amount of 0.3–0.4 wt. %; and coal tar taken in an amount of 14.5–31.2 wt. %.

It is the combination of the aforementioned components taken in carefully selected amounts in the presence of a vulcanizer of aerobic rubber hardening that makes it possible to obtain a compound featuring a prolonged shelf life under vacuum conditions. Such a compound can be produced under conditions of careful controlling and monitoring, thus assuring the production of a preset-quality product, which provides for vulcanization of rubber and turning it into cross-linked polymers at an instant required by the process technique involved.

Once a layer of the compound has been applied to the surfaces being joined together, it is necessary to immediately fill the space confined between the joining surfaces with a cement mortar.

According to the present invention, the cement mortar used contains the following components:
cement having a maximum expansion ratio of 0.3%, e.g., that based on aluminate slags having the following mineralogical components (wt. %):

| | |
|---|---|
| $3CaO \times SiO_2$ | 60 |
| $2CaO \times SiO_2$ | 17 |
| $2CaO \times Al_2O_3$ | 5 |
| $4CaO \times Al_2O_3 \times Fe_2O_3$ | 16 max. |
| $SO_3$ | 3.0–4.3 |
| $Al_2O_3$ | 5.04–6.5, | or a sulfoferrite-containing cement having an expansion ratio of not more than 0.3% and featuring the following mineralogical components (wt. %):

| | |
|---|---|
| $3CaO \times 3Fe_2O_3 \times CaSO_4$ | 20 |
| $2CaO \times Fe_2O_3 \times CaSO_4$ | 20 |
| $2CaO \times SiO_2$ | 30 |
| $6CaO \times Al_2O_3 \times 2Fe_2O_3$ | 20 |
| $3CaO \times SiO_2$ | 10 | any of the cements mentioned above being taken in an amount of 42 to 44 wt. %

The cement mortar used contains, apart from the amount of cement, the following components:
mortar sand taken in an amount of from 42 to 44 wt. %
cement setting promoter taken in an amount of from 1 to 2 wt. %
water taken in an amount of from 15 to 15 wt. %

The water/solid phase ratio of the cement mortar used is 0.17–0.19.

The cement mortar used may also incorporate a plasticizer, that is, an aqueous solution of condensation products based on formalinmelamine and sodium nitrosulfate taken in a maximum amount of 0.7% of the weight of cement.

The water/solid phase ratio in terms of dry matter being 0.15–0.17.

The cement mortar used contains, e.g., sodium aluminate or sodium fluoride, or liquid soda-ash glass as the cement hardener.

It is expedient that the space confined between the joining surfaces of the structures being joined together, be filled with the cement mortar fed at a pressure of 4 to 6 atm., whereby diverse-configuration spaces are reliably filled.

Cement-hardening and thiokol-vulcanization processes can proceed simultaneously due to the alkaline medium of the cement stone and the presence of oxides, i.e., CaO, $Al_2O_3$, and $Fe_2O_3$ therein, which are capable of producing a vulcanizing and strengthening effect on the thiokol-containing compound. Vulcanization and strengthening of the compound are additionally promoted due to a liquid phase, i.e., the freshly placed shrinkproof cement mortar. The water released during vulcanization of the thiokol-containing compound is fixed by the freshly placed cement mortar and thus does not weaken the joints. The additives make part of the thiokol-containing compound promote hardening of shrinkproof cement mortars modified by silicone polymers, aluminates, and superplasticizers, and form additional bonds at the interface of the two phases. It is due to the fact that such bonds arise in the presence of water and are irreversible, that the joint between the structures is characterized by a permanent time-dependent growth of adhesion.

On expiration of the cement hardening period, there results joined-together constructional structures possessing monolithic characteristics at their joint, whereby the structure works as an integral unit. These joined together structures are watertight at their joint, can withstand, without failure, cyclic tensile and compression loads, heating and cooling, and are antiseismic.

Strains that are liable to result from the effect of diverse loads are reliably compensated for and taken up by the layer established with the aid of the thiokol-containing compound, which is ensured by the high mechanical properties and adhesive properties of the layer with respect to both the cement stone and the material that the constructional structure is made from, e.g., metal, reinforced-concrete, or glass.

Combination of elastic and rigid materials at the joint between the structures, which feature high adhesion to one another, provides operation reliability of the structures under most diverse loads. In addition, compatibility and mutual strengthening of the materials provided to the joining of the structures are time-independent.

According to the present invention, it is expedient, for attaining a still higher strength of the joined-together constructional structures and buildings, that they be produced as follows:

First and foremost, the mating surfaces and the space confined therebetween of the structures and buildings to be joined together to obtain a single monolithic construction, are to be cleaned of dirt, corrosion, and fragments of the material of the constructional structure with a disturbed texture.

Thereupon at least one rubber rod is placed in the space confined between the mating surfaces. The rubber rods are arranged in the space in a direction square to the mating surfaces confining the space, when antiseismic structures and buildings are constructed. The present invention provides a possibility of arranging a rubber rod in the space in a direction parallel to the mating surfaces confining the space when it is necessary to obtain an increased wear resistance of constructional structures, such as runways of airfields, that experience high impact loads during operation. It is preferred to arrange the rubber rod in the space in the shape of the Greek letter lambda having its ends rigidly locked on the opposite mating surfaces, which enables the rubber rod to perform the function of a stress compensator.

According to the invention, the rubber rod used may be reinforced longitudinally with a metal wire rope so as to ensure reliable compensation for dynamic and vibratory loads experienced by constructional structures and buildings in higher seismic activity regions.

It is also preferred that joined-together constructional structures and buildings built in higher seismic activity areas be made with the aid of a reinforcing cage constituted by rubber rods reinforced by metal bars.

According to the invention, the rubber rods used have a transverse thickness substantially from 4 to 6 mm. The materials of such rods are preferably as follows:

vulcanized oil-gasoline resistant rubber based on butadiene-nitrile synthetic rubber having a scleroscope (Shore) hardness from 55 to 70;

vulcanized weather-resistant rubber based on chloroprene synthetic rubber having a Shore hardness of 65 to 85;

vulcanized oil-gasoline resistant rubber based on butadiene-nitrile synthetic rubber having a Shore hardness of 40 to 55;

vulcanized rubber based on a combination of synthetic isoprene rubber, butadiene rubber, and oil-extended styrene rubber taken in a ration of 50:30:20, respectively, having a Shore hardness of 55 to 65;

vulcanized rubber based on synthetic isoprene rubber and oil-extended butadiene-styrene rubber having a Shore hardness of 40 to 60; and vulcanized rubber based on synthetic isoprene rubber and butadiene-styrene rubber (75:25, respectively), having a Shore hardness of 80 to 100.

In addition, the rubber rods can be made from a thiokol-containing compound of the formulation stated above.

According to the present invention, it is expedient that longitudinal reinforcement of the rubber rods be achieved by metal wire ropes made from brass- or zinc-plate steel, or from an aluminum-magnesium alloy. It is expedient to use single-lay ropes featuring a linear contact of wires taken in the number of six, single-lay ropes with a point contact of wires taken in the number of 18 to 36, double-lay ropes with a linear contact between wires taken in the number of 42 twisted together into strands by six wires, or double-lay ropes with a point contact between wires 21 to 54 in number twisted together into strands by 7 or 18 wires. Principally, the metal rope used is 4.2 mm, 7.5 mm, or 8.25 mm in diameter. The wire rope used provides high strength, and low tensility; it does not virtually elongate and imparts strength and flexibility to the entire structure.

Once the aforementioned rubber rod has been placed in the space between the mating surfaces, a 0.1 to 2.0 mm thick layer of the thiokol-containing compound mentioned hereinbefore is applied to the mating surfaces and the rubber rod surface. To increase adhesion of the rubber rod surface to the cement mortar with which the space is to be filled, it is expedient to additionally dope the cement-based mortar with an aqueous thiokol dispersion, containing 40–60 wt. % of dry matter.

A further embodiment of the present invention relates to constructing roads and highways. In particular for road pavement in areas free from seismic activity, it is expedient that crumbles 2–5 mm in size of the aforementioned rubber be added to the cement mortar mentioned before, and then the resultant cement mortar be used for filling the spaces between the mating, constructional structures and buildings.

Conjoint use of the techniques discussed hereinabove for establishing the joining zone (with reference to the materials used) and the construction arrangement of such joining zone is instrumental in attaining such results as to strength of constructional structures and buildings that invariably retain their values after having been exposed to impact loads, e.g., seismic impacts.

For a better understanding of the present invention, the following are examples of its practical embodiments.

Example 1

Establishing a butt joint between prefabricated reinforced-concrete constructions in subway construction by a closed technique.

Referring to FIG. 1, the mating surfaces of the construction structures 1 are carefully cleaned of dust, dirt, and oil stains using wire brushes, so that spallings and concrete fragments exhibiting disturbed texture are eliminated.

Next, the following thiokol-containing compound 3 that has been enclosed in a vacuum package prior to use, is applied to every mating surface of the structures to be joined together, (g):

| | |
|---|---|
| liquid thiokol | 1000 |
| carbon black | 400 |
| cobaltosic oxide | 71 |
| $HN_2(CH_3)_3Si(OC_2H_5)_3$ | 65 |
| diphenylguanidine | 1.5 |
| ethylsilicate | 40 |
| oligoesteracrylate | 4 |
| coal tar | 110 |

The thus-applied layer of the thiokol-containing compound 3 has a thickness of 2.0 mm.

Just after applying such compound, the spaces confined between the mating surfaces of the structures being joined together are filled with a cement-based mortar 2 fed at a pressure of 4–6 atm.

The cement-based mortar 2 incorporates the following components:

sulfoferritic cement having a maximum expansion ration of 0.3%.

| | |
|---|---|
| clean mortar sand | 94.5 kg |
| sodium aluminate | 94.5 kg |
| sodium aluminate | 2 kg |
| water | 32.0 l |

In four hours, cement setting is observed.

Upon elapsing of 28 days, a sample is taken by boring the resultant butt joint between the structures and subjected to laboratory testing.

The physico-mechanical characteristics of the sample are as follows:

| | |
|---|---|
| Bending strength | 8.7 MPa |
| Compression strength | 66.7 MPa |
| Linear expansion | 0.1% |
| Water-tightness at a pressure of | 1.6 MPa |
| Self-stressing | 1.76 MPa |

Example 2

Establishing water-proof assembly holes in concrete structures used in subway construction.

The surfaces of the assembly hold are cleaned of dust and dirt with compressed air, wire brushes, and are flushed with water at a pressure of 4–6 atm.

Then the following compound is sprayed onto the pre-cleaned surfaces of the assembly hole (g):

| | |
|---|---|
| liquid thiokol | 80 |
| carbon black | 20 |
| cobaltosic oxide | 6.5 |
| $HN_2(CH_3)_3Si(OC_2H_5)_3$ | 5.5 |
| diphenylguanidine | 0.07 |
| butylsilicate | 2.6 |
| oligoesteracrylate | 0.3 |
| coal tar | 17.5 |

The result is a 0.1 mm thick layer of such compound.

Immediately thereafter a cement mortar of the following composition is pressure-fed (4–6 atm.) into the assembly hole involved:

| | |
|---|---|
| cement based on aluminate slage and having a maximum expansion ration of 0.3% | 94.5 kg |
| mortar sand | 94.5 kg |
| sodium aluminate | 2 kg |
| water | 35 l |

Upon elapsing of a 28-day period a quality test detected neither syripping nor pitting. Then a sample is bored out at the place where water-tighting of the assembly hole has been performed in the concrete structure involved, and the sample is tested in a laboratory. No water seeping is observed at a pressure above 1.8 MPa and a bending strength of 4.9 MPa.

Example 3

Carrying out joining together of elements of a column-girder complex in subway construction.

The hollow spaces in the "column-crossbar" structures are cleaned as described in Example 1, whereupon a 0.4 mm thick layer of a compound having the following components (g) is applied to such structures:

| | |
|---|---|
| liquid thiokol | 600 |
| carbon black | 225 |
| cobaltosic oxide | 50 |
| $HN_2(CH_3)_3Si(OC_2H_5)_3$ | 37.5 |
| diphenylguanidine | 0.75 |
| 2-methoxyethylsilicate | 20.5 |
| oligoesteracrylate | 2 |
| coal tar | 130.2 |

Then spaces are filled with a mortar based on a cement having a maximum expansion ration of 0.3% and having the following composition:

| | |
|---|---|
| sulfoferritic cement | 94.5 kg |
| mortar sand | 94.5 kg |
| sodium aluminate | 4.5 kg |
| water | 38.3 l |

The physico-mechanical characteristics of a sample bored out at the place of joint strengthening are as follows.

| | |
|---|---|
| Bending strength | 8.7 MPa |
| Compression strength | 66.8 MPa |
| Linear expansion | 0.1% |

No water seepage is observed at a pressure above 1.8 MPa.

Example 4

Carrying out hermetic sealing of the pavement expansion joint of a scaffold bridge.

Figure 2:
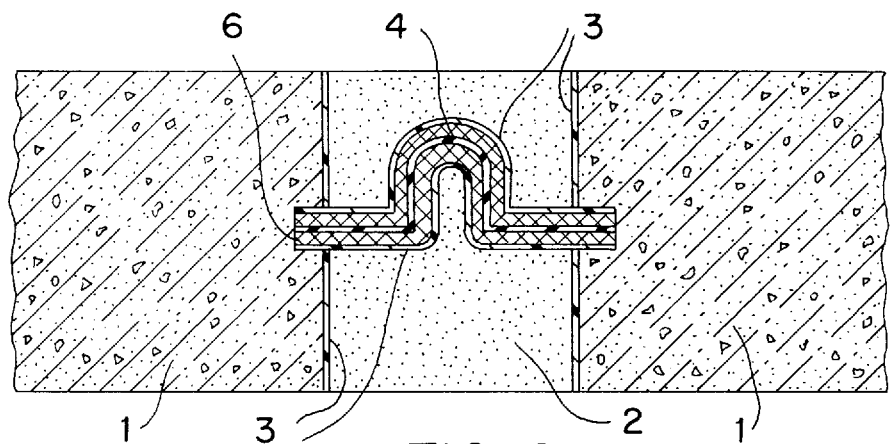
FIG. 2 is a longitudinal cross section of a portion of the sealing temperature joint of the roadway according to the present invention.

Reffering to FIG. 2, preconditioning of the expansion joint and treatment of the same with a thiokol-containing compound 3 and a mortar 2 based on a cement having a maximum expansion ratio of 0.3% are carried out under conditions similar to those of Example 3.

A lambda-shaped rubber rod 4 having a minimum cross-section of 4 mm is placed in the joint. The rubber rod 4 has at least one metal rope 6 contained therein. The rubber rod 4 has a height less than the depth of the expansion joint. The rod ends are rigidly held to the pavement elements to be joined together.

Use is made, however, of a thiokol-containing compound 3 having the following composition (g):

| | |
|---|---|
| liquid thiokol | 1100 |
| carbon black | 330 |
| cobaltosic oxide | 85 |
| $HN_2(CH_3)_3Si(OC_2H_5)_3$ | 70 |
| diphenylguanidine | 1.2 |
| ethylsilicate | 34 |
| oligoesteracrylate | 2.7 |
| coal tar | 82.4 |

Example 5

Carrying out sealing of units of stained-glass window panels.

Preparation of mating surfaces of the units, the treatment of the same with a thiokol-containing compound and a mortar based on a cement having a maximum expansion ratio of 0.3% are effected under conditions similar to those of Example 3.

Use is, however, made of the thiokol-containing compound of the following composition (g):

| | |
|---|---|
| liquid thiokol | 500 |
| carbon black | 200 |
| $HN_2(CH_3)_3Si(OC_2H_5)_3$ | 32 |
| diphenylguanidine | 0.7 |
| ethylsilicate | 20 |
| oligoesteracrylate | 2 |
| coal tar | 230.1 |

The cement-based mortar used has the following composition:

| | |
|---|---|
| sulfoferritic cement | 94.5 kg |
| mortar sand | 94.5 kg |
| condensation product based on formalinmelanine and sodium nitrosulfate | 0.6 |
| sodium aluminate | 4.4 kg |
| water | 37.4 l |

Example 6

Carrying out the butt joint of a cast-iron lining of a subway tunnel (closed technique).

After having been cleaned, the mating surfaces of cast-iron elements are treated with a thiokol-containing compound having the following composition (g):

| | |
|---|---|
| liquid thiokol | 900 |
| carbon black | 300 |
| cobaltosic oxide | 72 |
| $HN_2(CH_3)_3Si(OC_2H_5)_3$ | 68 |
| diphenylguanidine | 0.5 |
| ethylsilicate | 40 |
| oligoesteracrylate | 3.8 |
| coal tar | 230.1 |

The result is a 2.0 mm thick layer of the thiokol-containing compound.

The space confined between the mating surfaces is filled immediately thereafter with a mortar based on a cement having a maximum expansion ration of 0.3% and fed at a pressure of 4 to 6 atm.

The cement-based mortar has the following composition:

| | |
|---|---|
| sulfoferritic cement | 94.5 kg |
| mortar sand | 94.5 kg |
| sodium aluminate | 4.5 kg |
| water | 36 l |

In 28 days, a sample is bored out at the resultant joint between the mating surfaces and tested in a laboratory.

The physico-mechanical characteristics of the sample are as follows:

| | |
|---|---|
| Bending strength | 8.7 MPa |
| Compression strength | 66.8 MPa |
| Linear expansion | 0.1% |
| Water-tightness at a pressure exceeding | 1.8 MPa |
| Self-stressing | 1.76 MPa |

Example 7

Constructing a runway of an airfield.

Figure 3:
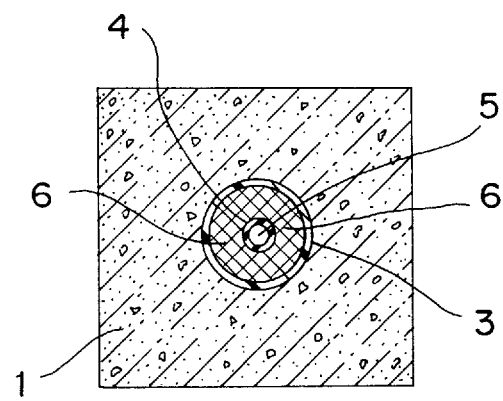
FIG. 3 is a cross section of a portion of the concrete layer of the runway of an airfield according to the present invention.

Referring to FIG. 3, on a preliminarily prepared construction site, there are established consecutively a layer of a 25 cm thick sand-gravel mixture, a cement-earth layer of Class 1 strength 24–28 cm thick, a layer of concrete 1 having a strength of 35–40 MPa and a thickness of 24 cm, a 0.5 mm thick layer of thiokol-containing compound 3, a 2 mm thick layer of a vulcanized rubber based on butadiene-nitrile synthetic rubber having a Shore hardness of 40–55, a 2 mm thick layer of a thiokol-containing compound, a layer of concrete 1 reinforced with 5.5 mm thick rubber rods 4 strengthened with metal wire ropes 6 therein and having a strength of 35–40 MPa and a thickness of 20 cm. The rubber rods 4 are made of a vulcanized rubber based on synthetic isoprene rubber and synthetic oil-extended butadiene-styrene rubber having a Shore hardness of 40–60. The wire rope 6 is made of brass-plated steel, has a diameter of 4.2 mm and features a double-lay with a point contact of wires in strands (3 strands each having 7 wires). The composition of a thiokol-containing compound is the same as in Example 1. The compression and expansion joints of the runway being constructed are filled with the thiokol-containing compound 3 and cement mortar 2 based on a cement having a maximum expansion ration of 0.3%; and both of them are similar to those of Example 4.

The thus constructed runway features high impact and seismic resistance and is capable of cushioning the dynamic impact of a landing aircraft without being destructed.

The presence of rubber slabs provides water-tightness, and is thus free from scours under the runway plates, and spallings.

Example 8

Repairing a road pavement in a region with increased seismic activity.

The road pavement fracture to be repaired is carefully cleaned of dirt and oil, so that spallings pavement fragments with an impaired texture are removed. The opposite surfaces of the fracture are bridged together with a cage made of rubber rods. Such rubber rods are reinforced with a metal wire rope which is rigidly held to the mating surfaces of the fracture. The rubber rods are 6 mm in diameter and are made of oil-gasoline resistant rubber based on synthetic butadiene-nitrile rubber containing the following components per 100 weight parts of the synthetic rubber:

| | |
|---|---|
| sulfur | 0.3 wt. % |
| tetramethyl-thiuram-disulfide | 2.5 wt. % |
| 2-mercaptobenzothiazole | 1.5 wt. % |
| zinc white | 2.0 wt. % |
| N-phenyl-N-isopropyl-n-phenilene-diamine | 1.0 wt. % |
| n-oxyphenyl- -napthylamine | 2.0 wt. % |
| wax 2.0 wt. % | |
| gas carbon black | 100 wt. % |
| dibutylphthalate | 27.0 wt. % |
| phthalic anhydride | 1.0 wt. % |
| synthetic fatty acids | 1.0 wt. % |

The metal wire reinforcing rope is made of brass-plated steel and has a diameter of 4.2 mm. The rope is of a single lay with a point contact of the wires taken in the number of 18.

The mating surfaces of the road pavement fracture being repaired and the rubber rods are coated with a 2.0 mm thick layer of a thiokol-containing compound similar to that of Example 1. The hollow space of the fracture is immediately filled with a mortar based on a cement having a composition similar to that of Example 1 but containing additionally 6 kg of a thiokol dispersion (40–60% of dry matter).

The repaired road pavement area withstands, without destruction, repeated cyclic loads as follows:

tension-compression, more than 5000 cycles, heating-cooling—the ageing coefficient after 100 cycles equals 0.00–1.00, that is, the repaired zone withstands heavy seismic impacts.

Example 9

Repairing bridge pavement fractures.

The zone of fracture is preconditioned as described in Example 8; but the mating surfaces of the fracture are braced together with rubber rods reinforced with metal wire ropes. The following materials are used:

vulcanized rubber based on synthetic isoprene rubber and synthetic butadiene-styrene rubber (75:25, respectively), containing (per 100 weight parts):

| | |
|---|---|
| sulfur | 40.0 wt. % |
| N-cyclohexyl-2-benzothiazolyl-sulphenamide | 3.0 wt. % |
| kaolin | 100.0 wt. % |
| calcined magnesia | 5.0 wt. % |
| synthetic fatty acids ($C_{21}$–$C_{25}$ fractions) | 1.0 wt. % |

The wire rope is made of brass-plated steel, 4.2 mm in diameter, and of double lay with a linear contact between the wires, and consists of 6 strands having 7 wires each.

The rubber rods placed in the fracture provide deformability and carrying capacity for the bridge.

Example 10

Repairing road pavement in the zones of movement joints.

The zones of movement joints are cleaned as described in Example 7. Then, rubber rods of 6 mm in diameter shaped as the Greek letter lambda are rigidly fixed in the mating space so as to form stress compensators.

The formulation of the rubber used for making the reinforcing rods is as follows:

| | |
|---|---|
| Chloroprene rubber | 100 wt. % |
| sulfur | 0.8 wt. % |
| tetramethyl-thiuram-disulfide | 0.8 wt. % |
| N-cyclobexyl-2-benzothiazolyl-sulfenamide | 0.8 wt. % |
| zinc white | 3.5 wt. % |
| magnesia | 6.0 wt. % |
| n-oxyphenyl- -napthylamine | 1.5 wt. % |
| paraffin | 7.0 wt. % |
| commercially pure carbon | 95.0 wt. % |
| rosin | 4.5 wt. % |

The mating surfaces, the rubber rods reinforced with a metal wire rope are similar to those described in Example 1 and are treated in a way similar to that of Example 8.

The resultant joint between a layer of the thiokol-containing compound and the cement layer holds a bending load of 80 kgf/cm², that is, its bending strength is comparable with that of uniform concrete based on brand 400 cement.

What I claim is:

1. A method for producing monolithic-flexible joined-together constructional structures and buildings which comprises:

cleaning the space between precleaned mating surfaces of the constructional structures and buildings involved;

placing at least one rubber rod into the space between the mating surfaces;

applying a 0.1 to 2 mm thick layer of a polysulfide-containing compound onto the precleaned mating surfaces to coat those surfaces, with the polysulfide-containing compound also being applied to the at least one rubber rod, and wherein the polysulfide-containing compound incorporates the following components, wt. %:

| | |
|---|---|
| liquid polysulfide | 80–120 |
| inorganic pigment | 20–45 |
| vulcanizer of aerobic rubber hardening | 6.5–10 |
| adhesive additive | 5.5–7.5 |
| rubber hardener | 0.05–0.15 |
| cross-linking agent | 2.6–4.1 |
| modifier | 0.3–0.4 |
| coal tar | 14.5–31.2,; | filling the space between the polysulfide-containing compound coated mating surfaces with a mortar based on a cement that has a maximum expansion ratio of 0.3%; and holding the resultant joined-together constructional structure or building for a period of time sufficient to vulcanize the polysulfide-containing compound and harden the cement based mortar, thus attaining elasto-monolithic properties for the joined-together constructional structures and building involved.

2. A method according to claim 1, wherein the cement based mortar comprises the following composition, wt. %:

| | |
|---|---|
| sulfoferritic cement | 42–44 |
| sand | 42–44 |
| cement setting promoter | 1–2 |
| water | 15–17; | wherein the water/solid phase ratio is from 0.17 to 0.19.

3. A method according to claim 2 wherein the cement based mortar further comprises a superplasticizer in a maximum amount of 0.7% of the dry cement weight.

4. A method according to claim 2 wherein the cement setting promoter is selected from the group consisting of sodium aluminate, sodium fluoride and liquid soda ash glass.

5. A method according to claim 1, wherein the cement based mortar includes an aqueous polysulfide dispersion containing a dry-matter content of 40 to 60% to enhance adhesion to the polysulfide-containing compound layer, at least one rubber rod or the mating surfaces.

6. A method according to claim 1, wherein the at least one rubber rod is arranged in the space in a direction square with the mating surfaces defining the space.

7. A method according to claim 1, wherein the at least one rubber rod is arranged in the space in a direction parallel to the mating surfaces defining the space.

8. A method according to claim 1, wherein the polysulfide-containing compound incorporates the following components, wt. %:

| | |
|---|---|
| liquid polysulfide | 100 |
| carbon black | 40 |
| cobaltosic oxide | 6.5 |

| | |
|---|---|
| Hn$_2$(CH$_3$)$_3$Si(OC$_2$H$_5$)$_3$ | 6.5 |
| diphenylguanidine | 0.15 |
| ethylsilicate | 4.0 |
| oligoesteracrylate | 0.4 |
| coal tar | 17.1. |

9. A method according to claim 1, wherein the at least one rubber rod is longitudinally reinforced with a metal wire rope.

10. A method according to claim 9, wherein the reinforcing metal wire rope is zinc- or brass-plated steel or an aluminum-magnesium alloy.

11. A method according to claim 1, wherein a plurality of rubber rods are placed between the mating surfaces.

12. A method according to claim 11, wherein the rubber rods are joined together to form a reinforcing cage.

13. A method according to claim 1 wherein the at least one rubber rod has a diameter of about 4 to 6 mm.

14. A method according to claim 1 wherein the at least one rubber rod is made of a vulcanized rubber or a polysulfide-containing compound.

15. A method according to claim 1 wherein the cement based mortar is filled into the space between the mating surfaces under a pressure of 4 to 6 bar to assure that the entire space is filled, even when diverse configurations are present, and to force the mortar to penetrate into the polysulfide-containing compound layer to facilitate bonding thereto.

16. A method according to claim 1 wherein the at least one rubber rod is bent into the shape of the Greek letter lambda so that the rod acts as a stress compensator.

17. A method for producing monolithic-flexible joined-together constructional structures and buildings which comprises:

cleaning the space between precleaned mating surfaces of the constructional structures and buildings involved;

placing a plurality of rubber rods having diameters of about 4 to 6 mm and made of a vulcanized rubber or a polysulfide-containing compound which is longitudinally reinforced with a metal wire rope into the space between the mating surfaces;

applying a 0.1 to 2 mm thick layer of a polysulfide-containing compound upon the precleaned mating surfaces to coat those surfaces, with the polysulfide-containing compound also being applied to the rubber rods, and wherein the polysulfide-containing compound incorporates the following components, wt. %:

| | |
|---|---|
| liquid polysulfide | 80–120 |
| inorganic pigment | 20–45 |
| vulcanizer of aerobic rubber hardening | 6.5–10 |
| adhesive additive | 5.5–7.5 |
| rubber hardener | 0.05–0.15 |
| cross-linking agent | 2.6–4.1 |
| modifier | 0.3–0.4 |
| coal tar | 14.5–31.2 | filling the space between the polysulfide-containing compound coated mating surfaces with a mortar based on a cement that has a maximum expansion ratio of 0.3% under a pressure of 4 to 6 bar to assure that the entire space is filled, even when diverse configurations are present, and to force the mortar to penetrate into the polysulfide-containing compound layer to facilitate bonding thereto; and holding the resultant joined-together constructional structure or building for a period of time sufficient to vulcanize the polysulfide-containing compound and harden the cement based mortar, thus attaining elastomonolithic properties for the joined-together constructional structures and building involved.

18. A method for producing monolithic-flexible joined-together constructional structures and buildings which comprises:

cleaning the space between precleaned mating surfaces of the constructional structures and buildings involved;

placing a plurality of rubber rods having diameters of about 4 to 6 mm and made of a vulcanized rubber or a polysulfide-containing compound which is longitudinally reinforced with a metal wire rope into the space between the mating surfaces;

applying a 0.1 to 2 mm thick layer of a polysulfide-containing compound upon the precleaned mating surfaces to coat those surfaces, with the polysulfide-containing compound also being applied to the rubber rods, and wherein the polysulfide-containing compound incorporates the following components, wt. %:

| | |
|---|---|
| liquid polysulfide | 80–120 |
| inorganic pigment | 20–45 |
| vulcanizer of aerobic rubber hardening | 6.5–10 |
| adhesive additive | 5.5–7.5 |
| rubber hardener | 0.05–0.15 |
| cross-linking agent | 2.6–4.1 |
| modifier | 0.3–0.4 |
| coal tar | 14.5–31.2 | filling the space between the polysulfide-containing compound coated mating surfaces with a mortar based on a sulfoferritic cement that includes a superplasticizer in a maximum amount of 0.7% of the dry cement weight, a cement setting promoter, and an aqueous polysulfide dispersion containing a dry-matter content of 40 to 60% to enhance adhesion to the polysulfide-containing compound layer, rubber rods or the mating surfaces, with the mortar having a maximum expansion ratio of 0.3% and being filled into the space under a pressure of 4 to 6 bar to assure that the entire space is filled, even when diverse configurations are present, and to force the mortar to penetrate into the polysulfide-containing compound layer to facilitate bonding thereto; and holding the resultant joined-together constructional structure or building for a period of time sufficient to vulcanize the polysulfide-containing compound and harden the cement based mortar, attaining elastomonolithic properties for the joined-together constructional structures and building involved.

* * * * *